United States Patent [19]

Kochka et al.

[11] Patent Number: 4,495,140
[45] Date of Patent: Jan. 22, 1985

[54] PERMANENT DEACTIVATION OF NUCLEAR REACTOR

[75] Inventors: Edgar L. Kochka, Pittsburgh, Pa.; Joseph M. Tobin, deceased, late of McMurray, Pa.; Arlene F. Neve, administratrix, Pittsburgh, Pa.

[73] Assignee: Westinghouse Electric Corp., Pittsburgh, Pa.

[21] Appl. No.: 324,365

[22] Filed: Nov. 24, 1981

[51] Int. Cl.³ .............................................. G21C 7/06
[52] U.S. Cl. ..................................... 376/207; 376/328
[58] Field of Search ............... 376/328, 329, 336, 282, 376/207; 149/22

[56] References Cited

U.S. PATENT DOCUMENTS

| | | | |
|---|---|---|---|
| 2,735,811 | 2/1956 | Weinberg et al. | 376/328 |
| 2,874,109 | 2/1959 | Cooper | 376/328 |
| 2,917,444 | 12/1959 | Dreffin | 370/328 |
| 2,990,358 | 6/1961 | Mawley | 376/328 |
| 3,228,847 | 1/1966 | Parkinson et al. | 376/338 |
| 3,365,367 | 1/1968 | Dolle | 376/328 |
| 3,629,059 | 12/1971 | Agazzi et al. | 376/328 |
| 3,682,771 | 8/1972 | Bennett | 376/338 |
| 3,860,482 | 1/1975 | Wheelock | 376/328 |
| 4,025,388 | 5/1977 | Jackson | 376/328 |
| 4,032,401 | 6/1977 | Froelich et al. | 376/330 |
| 4,057,465 | 11/1977 | Thompson et al. | 376/298 |
| 4,061,512 | 12/1977 | Chew et al. | 149/22 |
| 4,088,535 | 5/1978 | Thompson et al. | 376/293 |
| 4,279,697 | 7/1981 | Overhoff et al. | 376/328 |

FOREIGN PATENT DOCUMENTS 916326  1/1963  United Kingdom ............... 378/328

Primary Examiner—Salvatore Cangialosi
Attorney, Agent, or Firm—D. C. Abeles

[57] ABSTRACT

A gas cooled nuclear reactor is permanently deactivated on occurrence of an emergency by pyrolytic deposition of boron or refractory or stable compounds of boron in the fluid channels of the fuel elements of the reactor. The boron is enriched in boron 10. The deposition takes place in so short a time interval as to preclude a major catastrophe by reason of penetration of water into the reactor. Carbon and/or nitrogen-containing boron compounds are injected directly into the reactor or compounds generated by reaction in the working fluid of the reactor between diborane and other boron hydrides with unsaturated compounds, such as acetylene and ammonia flow through the reactor. The compounds are carried by the working fluid through the core and are pyrolized in the heat of the core to produce more stable boron, or boron-carbon and boron-nitrogen compounds or metal borides which adhere to the walls of the channels in the fuel elements, deactivating the core.

16 Claims, 3 Drawing Figures

PERMANENT DEACTIVATION OF NUCLEAR REACTOR

BACKGROUND OF THE INVENTION

This invention relates to the nuclear reactor art and has particular relationship to light-weight power plants for mobile or vehicular propulsion applications where a nuclear reactor is a primary source of energy. Such power plants are shown in Thompson-Pierce U.S. Pat. No. 4,057,465 and Thompson-Spurrier-Jones U.S. Pat. No. 4,088,535. The nuclear reactor included in such power plants is typically gas cooled. Usually the cooling gas is helium.

An important consideration in dealing with nuclear propulsion plants is reliable shutdown of the reactor by control of its reactivity under normal and abnormal conditions. Adequate reliable reactivity control is available for normal shutdown. But a different problem is presented on the occurrence of an emergency which results in failure that affects the reactor so that normal reactivity control is insufficient. This invention concerns itself with the need for reliable shutdown under such emergency conditions. It is an object of this invention to compensate for the insufficiency of the control and thereby provide for reliable shutdown of the reactor thereby precluding the happening of a catastrophe during the emergency.

Typically an emergency can arise when water penetrates into the core of nuclear reactors of certain types. For example a ship propelled by a light-weight power plant including an epithermal-neutron, gas cooled, nuclear reactor is sunk. The penetration of water into the core of the reactor is possible because the ship may sink to a depth, for example exceeding 600 feet, at which the containment of the reactor may rupture or for other reasons. The water may materially increase the nuclear reactivity of the reactor and thus may lead to a nuclear excursion and a serious catastrophe. it is an object of this invention to effectively and permanently deactivate the nuclear reactor supplying the primary energy to the propulsion plant of a ship when the ship is sunk and to accomplish this purpose before water can flood the core of the reactor.

SUMMARY OF THE INVENTION

In accordance with this invention the nuclear reactor of the propulsion power plant of a vehicle which has suffered an accident is deactivated permanently by impregnating the core with a refractory poison, specifically boron, boron carbide (or a boron-carbon polymer), boron nitride (or a boron-nitrogen polymer) or a metal boride. The isotope of boron which is an effective poison is $B_{10}$. There is 18.83% $B_{10}$ in natural boron. While the core may be impregnated with sufficient natural boron to effectuate permanent deactivation, it is desirable in the interest of reliable deactivation in the required short-time interval that the boron used be enriched in $B_{10}$. Typically boron is enriched by gas diffusion of boron trifluoride etherate. Typically the material is converted into diborane ($B_2H_6$) with an enrichment of up to 85%. Diborane is a gas at room temperature; it has a melting point of $-165.5°$ C. and a boiling point of $-92.5°$ C.

In the practice of this invention, diborane is reacted with unsaturated hydrocarbons, such as acetylene or alkyl hydrocarbons, to form heat sensitive carboranes, alkyl boranes, or alkyl diboranes. Appropriate products of these reactions (triethylboron, for example) are stored for injection into the coolant of the nuclear reactor on the occurence of an emergency. Or the individual reactants are injected into the coolant stream where they react and are carried along with their reaction products by the coolant through the core. Alternatively diborane is reacted with ammonia producing boron-nitrogen compounds which are also carried by the coolant through the core. At the lower or core inlet temperatures these compounds react to form less volatile boron-containing compounds that condense on the walls of the coolant channels penetrating the pores of graphite moderated reactors. These polymeric compounds are unusally stable to water and aqueous acids. At the elevated temperature of the core the boron-carbon and the boron-nitrogen compounds dissociate producing boron, boron carbide and boron nitride which adhere to the core. The latter materials are highly refractory. Boron has a melting point of 2300° C. and a boiling point of 2550° C. and is insoluble in water. Boron carbide, $B_4C$, has a melting point of 2450° C. and does not boil at 3500° C. and is insoluble in water. Boron nitride sublimates at 3000° C., is insoluble in cold water but dissociates slightly in hot water.

Diborane is highly reactive. When heated it generates higher and less volatile hydrides. The reactions are shown in the diagram below:

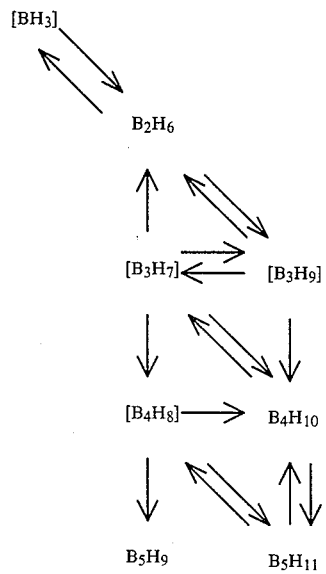

Horizontal lines represent addition or elimination of $H_2$
Vertical lines represent addition or abstraction of [BH]
Slanting lines represent addition or removal of [$BH_3$]

Reference is made to K. Wade, *Electron Deficient Compounds*, Nelson 1971, pp. 71, 86.

Diborane begins to decompose at temperatures as low as 300° C. to form, with increasing temperatures, higher and more stable hydrides. When heated at 600°–800° C., the hydrides decompose to boron and hydrogen. For example, the pyrolysis of diborane at 800° C. is used as a production method for high purity boron.

Although the reactor core exit temperature is 800° C. or higher, a high purity deposit is not required to deactivate a reactor. Diborane and other boron hydrides are more effective when reacted with unsaturated hydrocarbons or ammonia, particularly as the products of these reactions dissociate into the refractory compounds at lower temperatures than 800° C. In the presence of a reagent, for example, an acetylene or an alkyl hydrocarbon, the boron hydrides form other metal organic compounds.

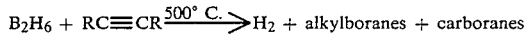

where R is H in the case of acetylene or an alkyl radical. Diborane and alkylboranes react to form a variety of alkyldiboranes.

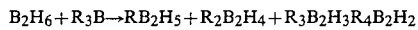

where R is an alkyl radical. Higher boron hydrides react with unsaturated hydrocarbons to form heat-sensitive carboranes. A reaction of a hydride with acetylene is as follows:

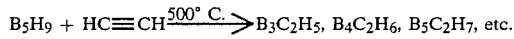

Carboranes decompose in the following manner:

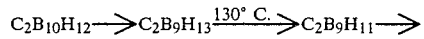

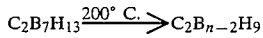

n = 8, 9, 10

When diborane and ammonia are heated together, boron-nitrogen oligomers or polymers of ill-defined composition form.

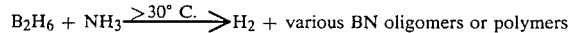

The pyrolysis of a boron-nitrogen compound, hydrazine-borane at 200° C. results in the formation of a polymeric compound that is unusually stable to water, but decomposes slowly above 200° C. to an unidentified compound with the empirical formula $(HBN)_n$ as follows:

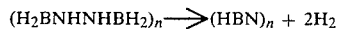

Ref: H. Steinberg and R. J. Brotherton, *Organoboron Compounds*, Vol. 2, Wiley & Sons, 1966.

The following diagram shows the reactions between diborane and ammonia:

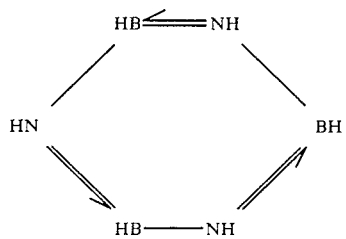

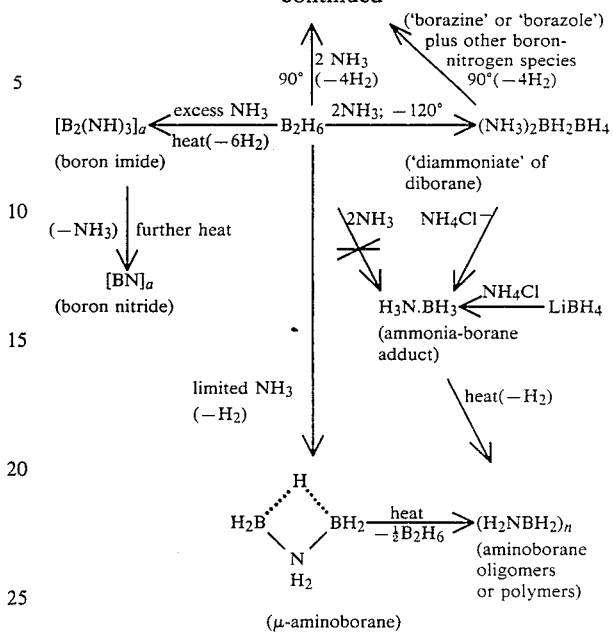

Reference is made to Wade above. Boron nitride is the ultimate product of the decomposition of the reaction products shown in the above diagram.

As the coolant carries the above compounds into and through the core the higher hydrides, carboranes and boron-nitrogen compounds deposit in the perforations at the lower or cold-leg core inlet temperatures. These compounds progressively break down to boron, borocarbons and boron-nitrogen compounds and to boron carbide or boron nitride at the higher core temperatures. Hydrogen liberated in these reactions may react with the graphite core to form volatile hydrocarbons that also react and combine with or entrap the boron compounds. Boron alkyls begin to decompose thermally above 200° C. Among the compounds which break down to provide boron carbide, triethyl boron requires special note. The following reactions occur:

Typical of the compound $B_xC_yH_z$ is $B_5CH$. All of the compounds in this series form rapidly and irreversibly and are stable, non-volatile solids insoluble in water.

Boron nitride is isoelectronic with graphite; i.e., except for mass and nuclear charge, the molecules of boron nitride and graphite resemble one another. They have the same number of valence electrons and should have similar orbitals. Thus, the structural properties of boron nitride and graphite are analogous and boron nitride produced by the thermal breakdown of aminoboranes or other boron-nitrogen compounds should be readily accommodated by the graphite core and firmly adhere to the porous walls of the reactor coolant passages. Some aminoboranes are commercially available; boron imides and borazole can also be used. The following reactions are typical:

Amminoborane $B_2NH \xrightarrow{heat} H_2NBH_2 + \frac{1}{2} B_2H_6$ $(H_2NBH_2)_n \xrightarrow{heat} [BN]_n + 2 H_2$ Boron imide $[B_2(NH_3)]_n \xrightarrow{heat} [BN]_n + NH_3 + 3/2 H_2$ Borazole $B_3N_3H_6 \xrightarrow{500°\ C.} (BNH)_x \xrightarrow{800°\ C.} BN$ With respect to the Borazole, reference is made to Gmelin's Handbuch der Anorganischen Chemi, 8th ed., Verlag Chemie, Weinheim/Bergstrasse No. 13 (1954).

Refractory boron containing compound also may be deposited through the thermal decomposition of a metal borohydride. The metal borohydrides are volatile at low temperatures and decompose in the range of 200°–400° C. For example, thorium borohydride has been decomposed at 300° C. leaving an amorphous, metallic deposit of $ThB_{3.83}$. Other borohydrides also leave metallic borides and probably uncombined boron upon thermal decomposition. Reference is made to Powell, Oxley and Blocher, *Vapor Deposition*, John Wiley & Sons, 1966, p. 345. Typical reactions are:

$Th(BH_4)_4 \rightarrow ThB_4 + 2 H_2$ $Hf(BH_4)_4 \rightarrow HfB_2 + 2 B + 8 H_2$

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
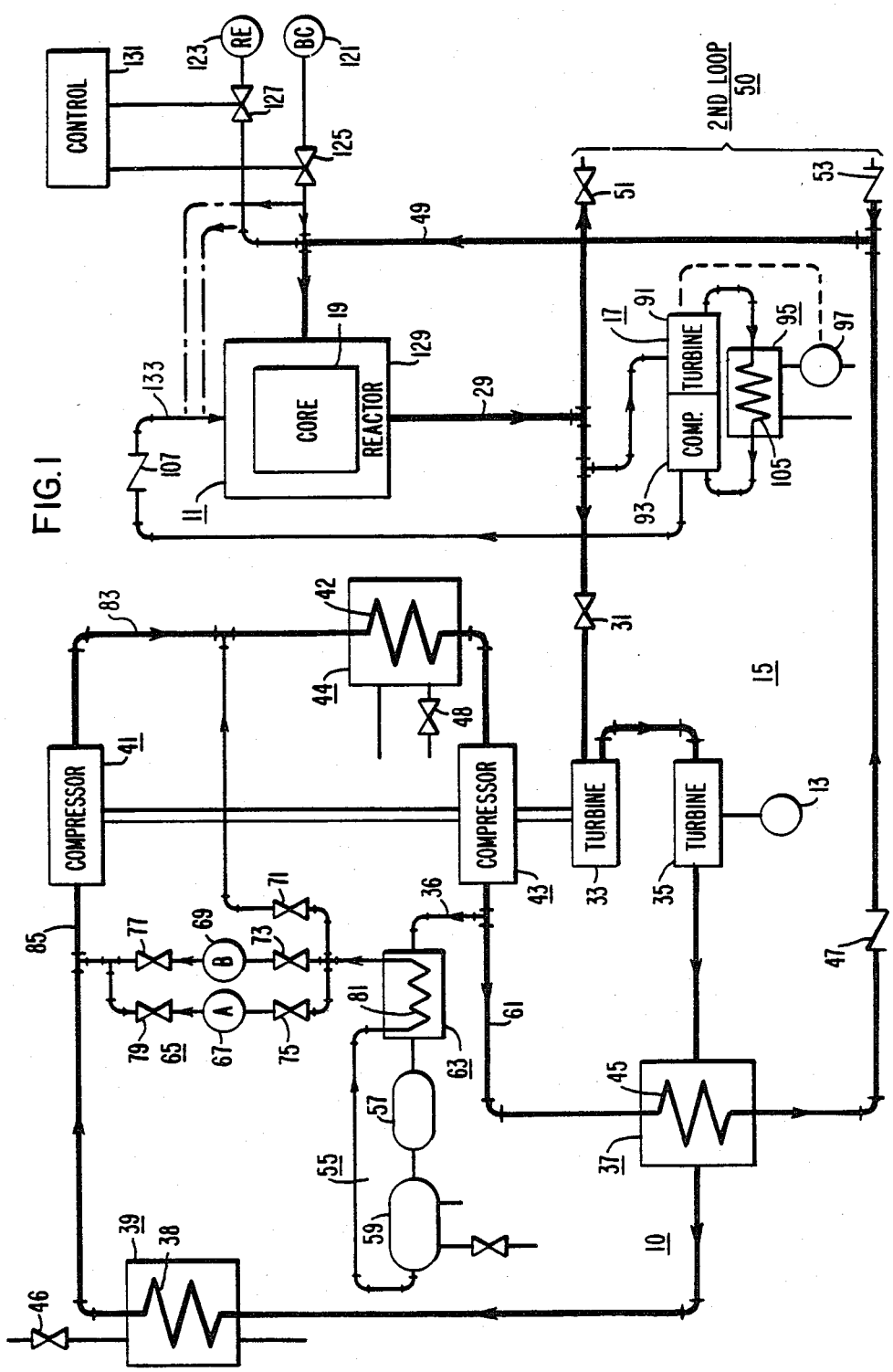
FIG. 1 is a schematic of a mobile nuclear-reactor power plant in the use of which this invention may be practiced in the event of an emergency.

The plant 10 shown in FIG. 1 includes a nuclear reactor 11 which serves as a prime energy source to drive the propulsors 13 from power-conversion system 15. This plant 10 may be used to drive the propeller 16 of a ship 18. The nuclear reactor 11 may also be cooled by an emergency cooling system 17 in the event of an emergency. The reactor 11 has a fissile core 19.

Typically the reactor 11 may be a 300 megawatt reactor that transfers energy to a working fluid coupled directly to a regenerative Brayton cycle. The coupling is shown in FIG. 1 as an energy conversion loop with the conduits through which the coolant flows in heavy lines. Typically the coolant is helium. It may also be another gas such as argon or hydrogen.

In the main power conversion loop 15 the working fluid flows from the hot leg 29 of the reactor through a shutdown valve 31, a gas-generator turbine 33, the power turbine 35 which drives the propulsors 13, a recuperator 37, the primary 38 of a precooler 39, a low-pressure compressor 41, the primary 42 of intercooler 44, a high-pressure compressor 43, the primary 45 of the recuperator 37, a check valve 47, to the cold leg 49 to the reactor 11. The working fluid can also flow in a like parallel power-conversion loop 50 (not shown completely) through shutdown valve 51 and back through check valve 53. The turbine 33 drives the compressors 41 and 43. The heat rejected in the recuperator 37 preheats the compressed working fluid returning to the reactor 11. The precooler 39 is connected to a heat absorber (not shown) through valve 56. The intercooler 44 is connected to a heat absorber (not shown) through valve 48.

The power-conversion loop 15 includes a working fluid cleanup system 55. This system 55 includes a molecular sieve 57 and charcoal bed 59 for purifying the coolant. A small portion, typically 3% of the working fluid, is continuously tapped from the conduit section 61 and passed through a heat economizer or heat absorber 63 and through the seive 57 and charcoal bed 59. the power-conversion loop 15 includes a system 65 for varying the power delivered by the plant. This system includes storage containers or bottles 67 and 69 of the working fluid and valves 71, 73, 75, 77, 79. The purified working fluid flows from charcoal bed 59 through the primary 81 of heat absorber 63 to the valves 71, 73, 75. Valve 71 is connected directly to conduit section 83 of the main loop 15. Valves 73 and 75 are connected to the containers 67 and 69. The containers 67 and 69 are connected to conduit section 85 through valves 77 and 79.

During steady-state operation valve 71 is open and valves 73, 75, 77 and 79 are closed. The purified gas (working fluid) is fed into the reactor 11 through the main conduit. To reduce power, valve 71 is closed, valves 77 and 79 remain closed, and either valves 73 or 75 are opened. The working fluid, typically at the rate of 3% per second, is fed into either containers 67 or 69. The working fluid in the main loop 15 and the power are reduced. Valve 71 remains closed and valves 73 or 75 remain open until the power is reduced to the desired magnitude. To increase power, valve 71 remains open, valves 73 and 75 are closed and valves 77 or 79 are opened. Additional working fluid, typically at the rate of 3% per second, is then supplied through conduit section 85. Valves 77 or 79 are closed when the power reaches the desired magnitude.

The emergency cooling system 17 is connected in the upstream side of valve 31. It includes a turbine 91, a compressor 93 and a cooling heat exchanger 95. A pump 97 driven by the turbine 91 drives a cooling fluid, typically water, through the heat exchanger. The turbine 91 also drives the compressor 93. The emergency cooling system is automatically set into operation responsive to the needs of the nuclear reactor 11 and continues to circulate working fluid through the reactor. If a break occurs in the main conduit loop, the emergency cooling system is enabled. Under these conditions working fluid will only flow out of the power conversion system until the containment pressure equals the pressure in the power conversion system where the break exists. Working fluid now flows through turbine 91, the primary 105 of heat exchanger 95, compressor 93, check valve 107, conduit 133, reactor core 19, cold leg 29 to turbine 91. Turbine 91 drives compressor 93 and provides a flow of working fluid through reactor 11.

Figure 2:
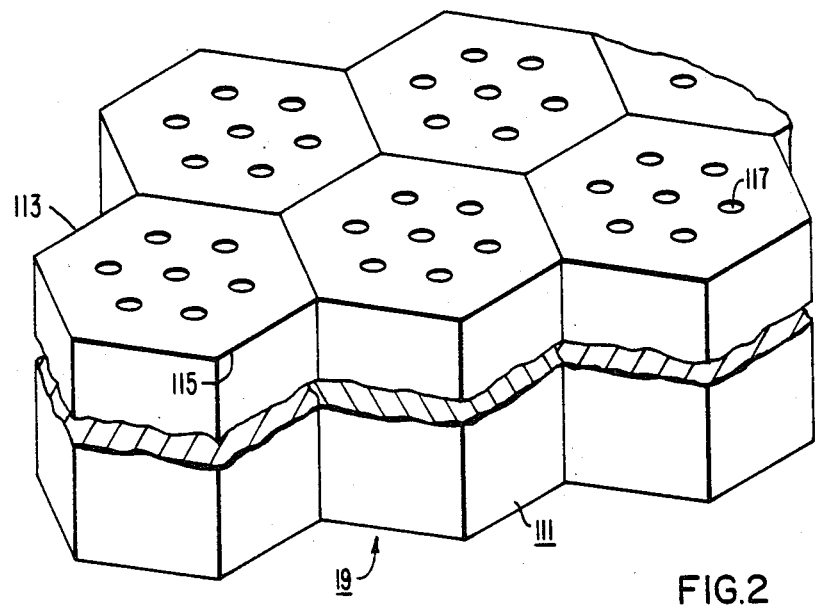
FIG. 2 is a fragmental view in perspective showing a portion of the core of the nuclear reactor of the apparatus shown in FIG. 1.
Figure 3:
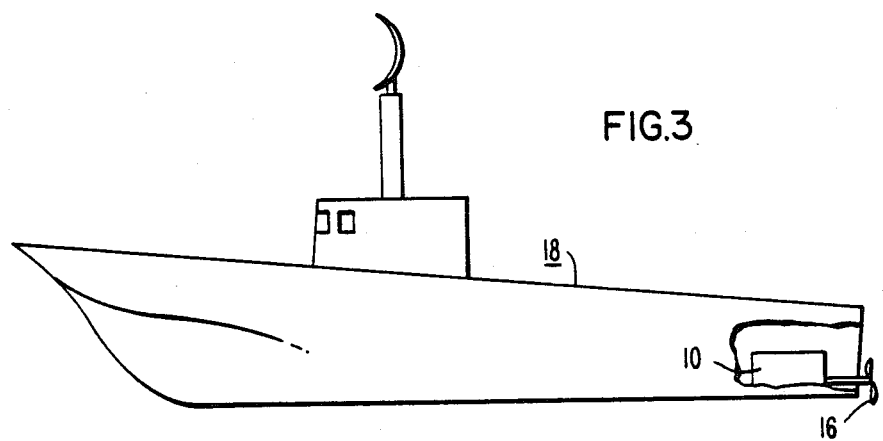
FIG. 3 is a generally diagrammatic view showing an application of the power plant shown in FIG. 1.

The core 19 (FIG. 2) is typically formed of hexagonal graphite fuel elements 111 with corresponding sides abutting to form a generally cylindrical structure. The fuel is in the form of beads as shown in FIG. 4 of Jones U.S. Pat. No. 4,021,298. The beads have a kernel of highly enriched uranium 235 or in any other fissile isotopes. Typically, the enrichment is up to 93%. The beads are embedded in the elements 111. Usually the elements are extruded from a mass containing the beads. Typically the distance between opposite flat surfaces 113 and 115 of an element is $\frac{3}{4}$ inch and the length of an element is 45 inches. The elements 111 have perforations 117 through which the coolant flows.

For permanently deactivating the reactor 11, the apparatus includes a container 121 (FIG. 1) containing a boron compound under pressure. Alternatively there may also be a container 123 containing a reacting agent under pressure in addition to container 121. Each container 121 and 123 is connected through valves 125 and 127 respectively and through the cold leg 49 directly to the reactor 11 through its pressure vessel 129. The containers 121 and 123 may also be connected through valves 125 and 127 to the conduit 133 downstream from check valve 107 as shown in broken lines. The valves 125 and 127 are normally closed. On the occurrence of an emergency they are opened by a control 131.

The boron container 121 contains a boron compound such as triethylboron or an aminoborane, and these compounds may be directly injected into the reactor. Alternatively, container 121 may contain diborane. In this case container 123 includes a reacting agent such as acetylene, an alkyl hydrocarbon or ammonia. When the substances from containers 121 and 123 are injected into the working fluid, they react in the heat of the fluid producing the alkyboranes, alkydiboranes, carboranes, or boron nitrogen oligomers. These resulting compounds are carried through the perforations 117 in the fuel elements 111. They dissociate on the heat of the core producing predominantly boron, boron carbide or a boron-carbon polymer and, in the case of the boron nitrogen oligomers boron nitride or a boron-nitrogen polymer which adhere to the walls of the perforations. The boron is usually enriched in boron 10 so that the reactor 11 is deactivated.

If a boron-carbon or boron-nitrogen compound or a metal borohydride serve as deactivating compounds, no reacting agent is necessary. For example, triethyl boron, aminodiborane or a metal borohydride are held under high pressure in container 121 and injected into the coolant on the occurrence of an emergency. If the compounds are liquids they may be sprayed into the coolant stream from the pressurized container 121. If the compounds are solids, they may be contained in the container 121 as a powder, and blown into the coolant when valve 125 is opened. The compounds, be they solid, liquid or gas, dissociate as they pass through the coolant channels in the structure 111. The resulting metal boride and/or other boron compounds deposit on the walls of the coolant channels.

The typical above mentioned 300 MW$_t$ plant consists of the reactor 11 with an open volume of 53 cubic feet, the plug shield and plenum (not shown) with a volume of 99 cubic feet, and the emergency cooling system circulator and heat exchanger with a volume of 20 cubic feet. Helium circulation through the system is at a rate of 11 lb/sec and a single-pass flow-through time, of about 2.5 seconds. A reactive compound introduced into the emergency cooling system 17 makes at least about 8 passes through the core 19 before the influx of water begins. Maximum deposition is required to occur to effectively terminate the nuclear reactions before water influx begins.

Calculations based on neutronic considerations indicate that a conservative estimate of 10 Kg of B-10 as boron or as a refractory compound uniformly distributed on the core channel surface area of about 2,625,000 cm$^2$, in the case of the typical 300 MW$_t$ plant, will poison a water-flooded reactor. This requires the deposition of approximately 0.004 gm B-10/cm$^2$ or an approximate thickness of 0.6 mil (3.8 mils natural boron carbide). For maximum effectiveness, as much of the B-10 containing compound as possible should be deposited in a single pass through the core. The deposit should be in a form of a film so that it does not block a flow passage.

Candidate compounds must be capable of being stored in a container subject to ambient conditions of atmospheric pressures to 300 psi and 140° to 200° F. for long periods of time. Although storage is assumed to be inside the containment vessel, storage outside the containment, may be necessary if long term stability cannot be guaranteed and periodic replacement with fresh compound is required. However, it is desired to keep penetrations of the containment vessel to a minimum and compounds with long-term stability should be chosen.

The compound will be injected into the working fluid, under high pressure, in the event of a sinking accident. The most desirable point of injection is directly above the reactor core. The goal is for the compound to dissociate and/or react to give a high yield of a distributed boron-containing deposit in each pass over a surface having both radial and axial temperature gradients. As mentioned, there are at least eight passes before water is introduced into the reactor containment. Flooding of the core must not adversely affect the deposit, and the deposit may be able to remain indefinitely adherent to the substrate and not be adversely affected by the corrosive aqueous environment. The boron, boron carbide, boron nitride and the metal borides meet these conditions.

While preferred practices and embodiments of this invention have been disclosed herein, many modifications thereof are feasible. This invention is not to be restricted except insofar as is necessitated by the spirit of the prior art.

What is claimed is:

1. The method of permanently deactivating, in the event of an emergency, a nuclear reactor whose working fluid is a gas and whose fuel is contained in a body having channels for conducting the working fluid, the said method comprising deriving borane from boron trifluoride etherate in which the boron is substantially enriched in B$_{10}$, reacting said borane with one or more of the class consisting of unsaturated hydrocarbons and ammonia to produce respectively one or more of the class consisting of carboranes, alkyl boranes, and alkyl diboranes or boron nitrogen products, (the carboranes, boranes, diboranes, and carbon nitrogen products being all herein referred to as last-named compounds), injecting one or more of said last-named compounds into said working fluid so that said compounds are circulated with said working fluid through said channels of said body, while said compounds are in said body converting said compounds into one or more of the class of materials consisting of boron and the highly-refractory compounds of boron and carbon and/or boron and nitrogen, and adhering said material to the walls of said channels, sufficient compounds being converted to provide sufficient converted material to deactivate said nuclear reactor permanently.

2. The method of permanently deactivating, in the event of an emergency, a nuclear reactor whose working fluid is a gas and whose fuel is contained in a body having channels for conducting the working fluid, the said method comprising: responsive to the occurrence of said emergency generating one or more compounds of boron containing one or more of the class consisting of carbon and nitrogen, circulating said compound in said working fluid as a fluid through said channels, while said compounds are in said body converting said compounds into one or more of the class of materials consisting of boron and of highly-refractory compounds of boron and carbon and boron and nitrogen and adhering said material to the walls of said channels, sufficient highly-refractory compounds being generated to provide sufficient converted material to deactivate said nuclear reactor permanently.

3. The method of claim 1 wherein the boron in the compounds is substantially enriched in the isotope $B_{10}$.

4. The method of claim 1 for use with a nuclear reactor having a core whose coolant channels are composed of graphite wherein the converted compounds of boron are converted into boron nitride.

5. The method of claim 1 including the additional step of reacting diborane with alkyl hydrocarbons to produce the heat-sensitive compounds alkydiboranes for circulation through the fluid channels and conversion.

6. The method of claim 1 including the additional step of reacting diborane with acetylene to produce heat-sensitive carboranes compounds for circulation through said channels and conversion.

7. The method of claim 1 including the step of reacting diborane with ammonia to produce compounds of boron and nitrogen for circulation through the channels and conversion.

8. The method of claim 5 wherein the diborane and alkyborane are reacted predominately in the coolant of the nuclear reactor.

9. The method of claim 6 wherein the diborane and the acetylene are reacted predominately in the coolant of the nuclear reactor.

10. The method of claim 7 wherein the diborane and ammonia are reacted predominately in the coolant of the nuclear reactor.

11. The method of claim 1 wherein the fluid compound is repeatedly circulated through the fluid channels, the circulation through the fluid channels taking place in a short-time interval such that a number of passes sufficient to deactivate the reactor are completed before the emergency event can result in the catastrophe which the method is carried out to preclude.

12. The method of permanently deactivating the nuclear reactor, which constitutes the primary energy source of a propulsion plant of a ship to preclude an increase in reactivity resulting from the flooding of the core, the fuel of said nuclear reactor being embedded in a body having fluid channels accessible to the fuel and the working fluid of said nuclear reactor being a gas, the said method comprising, responsive to the flooding of the core on the sinking of the ship, generating compounds of boron containing one or more of the class consisting of carbon or nitrogen, circulating said compounds in said working fluid as a fluid through said fluid channels in said body, while said compounds are in said body converting said compounds into one or more of the class of materials consisting of boron and of highly-refractory compounds of boron, carbon and nitrogen, and adhering said material to the walls of said channels to deactivate said nuclear reactor, sufficient highly-refractory compounds being generated to provide sufficient converted material to deactivate said nuclear reactor permanently, said compounds being circulated and converted and said nuclear reactor being deactivated in a time interval that is so short that said reactor is deactivated before flooding occurs.

13. The method of claim 12 wherein the compounds are generated in the coolant.

14. The method of permanently deactivating, in the event of an emergency resulting in increased core reactivity, a nuclear reactor whose working fluid is a gas and whose fuel is contained in a body having channels for conducting said working fluid, the said method comprising, responsive to the occurrence of said emergency, injecting in said working fluid as a fluid a metal borohydride, circulating said metal borohydride as a fluid in said working fluid through said channels, while said metal borohydride is in said body dissociating said metal borohydride into a material of one of the class consisting of metal borides and boron, and adhering said material to the walls of said channels, sufficient metal borohydride being injected to provide sufficient material to deactivate said nuclear reactor permanently.

15. The method of claim 14 wherein the metal borohydride is one or more of the class consisting of thorium borohydride and hafnium borohydride.

16. The method of claim 1 wherein the highly-refractory compounds of boron and carbon and boron and nitrogen include one or more of the class consisting of boron, boron carbide, and boron nitride.

* * * * *